(12) United States Patent
Ohsugi

(10) Patent No.: US 10,569,769 B2
(45) Date of Patent: Feb. 25, 2020

(54) VEHICLE CONTROL DEVICE

(71) Applicant: TOYOTA JIDOSHA KABUSHIKI KAISHA, Toyota-shi, Aichi-ken (JP)

(72) Inventor: Masamichi Ohsugi, Sunto-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/132,902

(22) Filed: Sep. 17, 2018

(65) Prior Publication Data

US 2019/0152473 A1    May 23, 2019

(30) Foreign Application Priority Data

Nov. 17, 2017    (JP) ................................. 2017-222158

(51) Int. Cl.
*B60W 30/09* (2012.01)
*B60W 30/14* (2006.01)
*B60W 30/16* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01); *B60W 30/14* (2013.01); *B60W 30/16* (2013.01); *G06K 9/00798* (2013.01); *G06K 9/00805* (2013.01); *G08G 1/166* (2013.01); *G08G 1/167* (2013.01); *B60T 2201/02* (2013.01); *B60W 2520/06* (2013.01); *B60W 2520/14* (2013.01); *B60W 2550/30* (2013.01); *B60W 2550/302* (2013.01); *B60W 2550/306* (2013.01); *B60W 2550/308* (2013.01)

(58) Field of Classification Search
CPC ........... B60W 2550/308; B60W 30/09; B60W 30/0953; B60W 30/0956; G06K 9/00798; G06K 9/00805; G08G 1/166; G08G 1/167
See application file for complete search history.

(56) References Cited

U.S. PATENT DOCUMENTS 6,294,986 B1    9/2001  Landsiedel
6,859,731 B2 *  2/2005  Takafuji .............. B60R 21/0132
                                              180/167
(Continued)

FOREIGN PATENT DOCUMENTS

DE    19835518 A1    4/1999
EP     3007150 A1    4/2016
(Continued)

*Primary Examiner* — Babar Sarwar
(74) *Attorney, Agent, or Firm* — Sughrue Mion, PLLC

(57) ABSTRACT

If the sign of the relative speed of the non-fixed object is negative, the determination width for own lane is expanded in the lane-width direction. According to the expanded determination width for own lane, both the preceding vehicle on the adjacent lane and the preceding vehicle on the own lane are recognized as existing on the own lane. Therefore, if it is determined that the risk to collide with the preceding vehicle on the adjacent lane is high, the decelerating assist control is executed to prevent collision with this preceding vehicle. Also, if it is determined that the risk to collide with the preceding vehicle on the own lane is high, the decelerating assist control for preventing collision with this preceding vehicle is executed.

6 Claims, 10 Drawing Sheets

(51) Int. Cl.
*G06K 9/00* (2006.01)
*G08G 1/16* (2006.01)

(56) References Cited

U.S. PATENT DOCUMENTS

| | | | | |
|---|---|---|---|---|
| 7,016,783 | B2* | 3/2006 | Hac | B60K 31/0008 |
| | | | | 701/301 |
| 9,682,703 | B2* | 6/2017 | Okita | B60T 8/17558 |
| 9,965,956 | B2* | 5/2018 | Tsushima | G08G 1/16 |
| 2006/0136132 | A1* | 6/2006 | Sawamoto | B60W 30/16 |
| | | | | 701/301 |
| 2008/0281521 | A1* | 11/2008 | Shirato | B60T 7/22 |
| | | | | 701/301 |
| 2010/0299043 | A1* | 11/2010 | Dorenkamp | B60W 30/16 |
| | | | | 701/96 |
| 2012/0101713 | A1* | 4/2012 | Moshchuk | B60W 10/184 |
| | | | | 701/301 |
| 2013/0218396 | A1* | 8/2013 | Moshchuk | B60W 50/08 |
| | | | | 701/25 |
| 2014/0032049 | A1* | 1/2014 | Moshchuk | B62D 15/0265 |
| | | | | 701/42 |
| 2014/0032093 | A1* | 1/2014 | Mills | B60W 40/107 |
| | | | | 701/301 |
| 2014/0229069 | A1* | 8/2014 | Akiyama | B60T 7/12 |
| | | | | 701/41 |
| 2014/0350813 | A1* | 11/2014 | Jeon | B60W 30/09 |
| | | | | 701/70 |
| 2015/0232090 | A1* | 8/2015 | Jeon | B60T 7/12 |
| | | | | 701/41 |
| 2015/0251656 | A1* | 9/2015 | Yester | B60W 30/09 |
| | | | | 701/41 |
| 2015/0291158 | A1* | 10/2015 | Okita | B60T 8/17558 |
| | | | | 701/1 |
| 2017/0309182 | A1* | 10/2017 | Murray | G08G 1/167 |
| 2019/0152473 | A1* | 5/2019 | Ohsugi | B60W 30/0953 |

FOREIGN PATENT DOCUMENTS

| | | |
|---|---|---|
| JP | 2007-253714 A | 10/2007 |
| RU | 2605812 C2 | 12/2016 |

* cited by examiner

VEHICLE CONTROL DEVICE

CROSS-REFERENCE TO RELATED APPLICATION

The present disclosure claims priority under 35 U.S.C. § 119 to Japanese Patent Applications No. 2017-222158, filed on Nov. 17, 2017. The contents of these applications are incorporated herein by reference in their entirety.

TECHNICAL FIELD

The present disclosure relates to a vehicle control device. More specifically, the present disclosure relates to a vehicle control device to prevent a vehicle from colliding with obstacles.

BACKGROUND

JP 2007-253714 A discloses an in-vehicle radar equipment for determining whether or not a preceding vehicle exists on an own lane on which a subject vehicle travels by using a virtual determination width for own lane. When the radar equipment recognizes a nearest preceding vehicle to the subject vehicle among the surrounding vehicles of the subject vehicles which are detected by an in-vehicle radar within a determination width for own lane, it recognized the nearest preceding vehicle as the preceding vehicle on the own lane. Once the radar equipment recognized the nearest preceding vehicle on the own lane, it applies a wide determination width for own lane to the nearest preceding vehicle on the own lane while applying a narrow determination width for own lane to the other preceding vehicles.

According to the radar equipment, once the nearest preceding vehicle on the own lane is recognized, it is possible to prevent other vehicles on the adjacent lane from being erroneously recognized as the preceding vehicle on the own lane. However, before recognizing the nearest preceding vehicles on the own lane, the following problem arises. That is, when the nearest preceding vehicle on the own lane has not been recognized whereas a nearest preceding vehicle to the subject vehicle which is detected by the in-vehicle radar travels far from the subject vehicle, it is difficult to distinguish whether or not the detected nearest preceding vehicle travels on the own lane or the adjacent lane.

If a default value of the determination width for own lane is set to a narrow width, it is possible to prevent the detected nearest preceding vehicle from recognizing as the nearest preceding vehicle on the own lane even though it actually travels on the adjacent lane. However, when the default value is set to the narrow width, it takes time to recognize a true object to be recognized on the own lane. This is because if the default value is set to the narrow width, it is not able to recognize the true object until the distance to the subject vehicle decreases to some extent.

If it takes time to recognize the true object to be recognized, the following problem occurs when the subject vehicle traveling at high speed catches up with a tail of a traffic congestion. That is, when a preceding vehicle of the subject vehicle is located in the tail of the traffic congestion, in order to prevent collision with this rearmost vehicle, it is necessary for the subject vehicle to start decelerating assist control from a relatively long distance. However, when it takes time to recognize the rearmost vehicle, the decelerating assist control will be started after the subject vehicle approaches the rearmost vehicle to some extent. Therefore, it is necessary for the subject vehicle to start rapid deceleration, which gives a sense of discomfort to occupant of the subject vehicle.

The present disclosure addresses the above described problem, and an object of the present disclosure is, to provide measures to prevent the subject vehicle from colliding with a nearest preceding vehicle even in a case where it is difficult to distinguish the lane along which the nearest preceding vehicle travels.

SUMMARY

A first aspect of the present disclosure is a vehicle control device for solving the problem described above and has the following features.

The vehicle control device comprises a non-fixed object detection device and a control unit.

The non-fixed object detection device is configured to detect a non-fixed object in front of a subject vehicle.

The control unit is configured to execute decelerating assist control of the subject vehicle based on detection result of the non-fixed object.

The control unit the control unit is further configured to:

calculate relative distance in a vehicle's width direction of the subject vehicle between the subject vehicle and a nearest non-fixed object to the subject vehicle of all the non-fixed objects; and determine whether or not to execute the decelerating assist control by comparing the relative distance and a determination width for determining an own lane along which the subject vehicle travels, wherein the determination width for own lane is set based on relative speed of the nearest non-fixed object in a travel direction of the subject vehicle.

A second aspect of the present disclosure has the following features according to the first aspect.

The control unit is further configured to variably set the determination width for own lane.

The control unit is configured to, when the sign of the relative speed of the nearest non-fixed object in the travel direction of the subject vehicle is negative, set the determination width for own lane to a broad width as the absolute value of the relative speed of the nearest non-fixed object in the travel direction of the subject vehicle increases.

A third aspect of the present disclosure has the following features according to the first aspect.

The control unit is further configured to set a first correction coefficient for correcting the determination width for own lane.

The control unit is configured to, when the sign of the relative speed of the nearest non-fixed object in vehicle's width direction of the subject vehicle is negative, set the first correction coefficient to a larger value as the absolute value of the relative speed in the vehicle's width direction increases.

A fourth aspect of the present disclosure has the following features according to the first aspect.

The control unit is further configured to set a second correction coefficient for correcting the determination width for own lane.

The control unit is configured to, when an angle between an anterior-posterior axis of the nearest non-fixed object and a center line of the own lane is within a predetermined range, set the second correction coefficient to a larger value as the angle increases.

A fifth aspect of the present disclosure has the following features according to the first aspect.

The control unit is further configured to:

determine whether or not the nearest non-fixed object exists on the own lane based on a comparison between the determination width for own lane and the relative distance; and execute first decelerating assist control of the subject vehicle when it is determined that the nearest non-fixed object exists on the own lane.

The first decelerating assist control is executed based on the relative speed of the nearest non-fixed object, which is determined to exist on the own lane, in the travel direction of the subject vehicle.

A sixth aspect of the present disclosure has the following features according to the first aspect.

The control unit is further configured to:

determine whether or not the nearest non-fixed object exists on an adjacent lane of the own lane based on a comparison between a determination width for adjacent lane and the relative distance, wherein the determination width for adjacent lane is set by adding a width of the adjacent lane to the determination width for own lane; and execute second decelerating assist control of the subject vehicle when it is determined that the nearest non-fixed object exists on the adjacent lane.

The second decelerating assist control is executed based on the relative speed of the nearest non-fixed object, which is determined to exist on the adjacent lane, in the travel direction of the subject vehicle.

According to the first aspect, it is determined whether or not to execute the decelerating assist control by the determination width for own lane which is set based on the relative speed of the nearest non-fixed object in the travel direction of the subject vehicle. In other words, whether or not to execute the decelerating assist control is determined not only when the nearest non-fixed object exist on the own lane but also on the adjacent lane. Therefore, it is possible to execute the decelerating assist control even in the case where it is difficult to distinguish the lane along which the nearest preceding vehicle travels.

According to the second aspect, when the sign of the relative speed of the nearest non-fixed object in the travel direction of the subject vehicle is negative, the determination width for own lane is set to a broad width as the absolute value of the relative speed in the travel direction is larger. The sign of the relative speed sign in the travel direction is negative, which means that a distance in the travel direction between the subject vehicle and the nearest non-fixed object is narrowing. Therefore, if the determination width for own lane is set to the broad width according to the absolute value of the relative speed in the travel direction, it is possible, in a case where the distance in the travel direction is narrowing, to execute the decelerating assist control while assuming that the nearest non-fixed object would intrude into the own lane in the near future.

According to the third aspect, when the sign of the relative speed of the nearest non-fixed object in the vehicle's width direction of the subject vehicle is negative, the first correction coefficient which corrects the determination width for own lane is set to a larger value as the absolute value of the relative speed in the vehicle's width direction increases. The sign of the relative speed sign in the travel direction is negative, which means that a distance in the vehicle's width direction between the subject vehicle and the nearest non-fixed object is narrowing. Therefore, if the first correction coefficient is set to the larger value according to the absolute value of the relative speed in the vehicle's width direction, it is possible, in a case where the distance in the vehicle's width direction is narrowing, to execute the decelerating assist control while assuming that the nearest non-fixed object would intrude into the own lane in the near future.

According to the fourth aspect, when the angle between the anterior-posterior axis of the nearest non-fixed object and the center line of the own lane is within a predetermined range, the second correction coefficient which corrects the determination width for own lane is set to a larger value as the angle increases. By appropriately setting the predetermined range, it is possible to estimate the distance in the vehicle's width direction is narrowing. Therefore, it is possible, in a case where the distance in the vehicle's width direction is narrowing, to execute the decelerating assist control while assuming that the nearest non-fixed object would intrude into the own lane in the near future.

According to the fifth aspect, it is possible to appropriately prevent the subject vehicle from colliding with the nearest non-fixed object which exists on the own lane.

According to the sixth aspect, it is possible to appropriately prevent the subject vehicle from colliding with the nearest non-fixed object which exists on the adjacent lane at his time and has possibility to intrude into the own lane in the near future.

DESCRIPTION OF EMBODIMENTS

Figure 1:
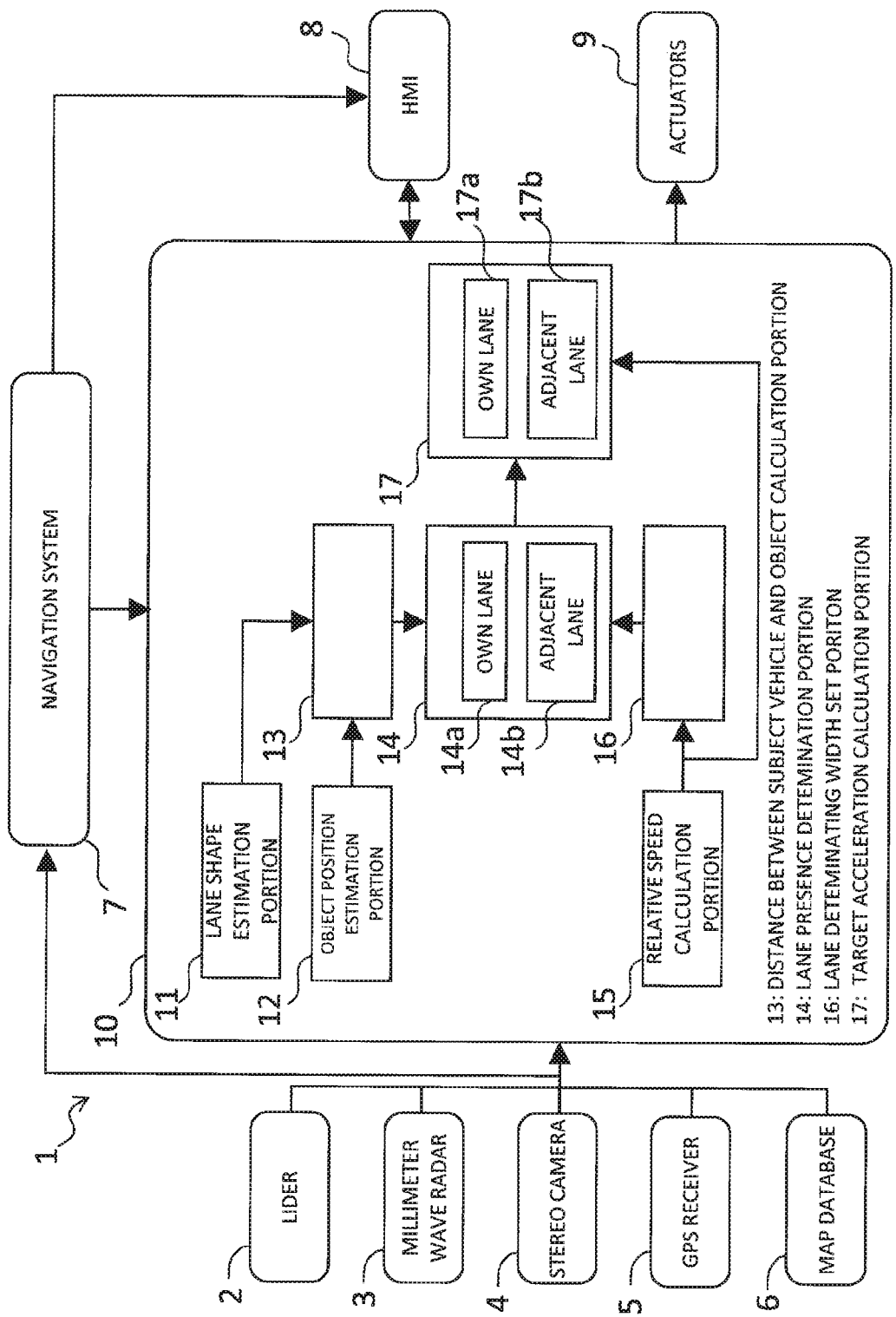
FIG. 1 is a diagram for showing a configuration of an automatic drive system to which a vehicle control device according to a first embodiment of the present disclosure is applied.

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

A first embodiment of the present disclosure will be described with reference to FIGS. 1 to 8.

1. Configuration of Automatic Drive System

FIG. 1 is a diagram for showing a configuration of an automatic drive system to which a vehicle control device according to the first embodiment is applied. The automatic drive system is installed in a vehicle and is configured to autonomously execute various travel assist controls of the vehicle or automatically execute these controls with a driver's permission. A vehicle equipped with the automatic drive system is also called a "subject vehicle".

The automatic drive system 1 shown in FIG. 1 includes an electric control unit (ECU) 10 which functions as a vehicle control device, and autonomous recognition sensors. The autonomous recognition sensors include a LIDER (i.e., laser imaging detection and ranging) 2, a millimeter wave radar 3 and a stereo camera 4. These autonomous recognition sensors are connected to the ECU 10 directly or via a communication network such as a controller area network (CAN) built in the subject vehicle. From object information obtained by the autonomous recognition sensors, the ECU 10 is able to grasp surrounding situation of the subject vehicle.

The automatic drive system 1 further includes a global positioning system (GPS) receiver 5, a map database 6, a navigation system 7, a human machine interface (HMI) and actuators 9.

The GPS receiver is means for acquiring positional information. The positional information indicates position of the subject vehicle based on a signal transmitted by at least one GPS satellite. The map database 6 is formed, for example, in a storage such as an HDD or an SSD mounted in the subject vehicle. Map information in the map database 6 includes positional information of roads, information of road shape, positional information of intersections and branch points, lane information of roads, and the like. The navigation system 7 is configured to calculate a traveling route of the subject vehicle based on the positional information of the subject vehicle obtained by the GPS receiver 5 and the map information stored in the map database 6. The navigation system 7 is further configured to transmit information on the calculated traveling route to the driver of the subject vehicle via the HMI 8 and output the information on the calculated traveling route to the ECU 10.

The HMI 8 is an interface for exchanging information between the occupant of the subject vehicle and the ECU 10. Each of the actuators 9 is configured to operate in response to an operation signal from the ECU 10 thereby traveling state of the subject vehicle is changed. The actuators 9 are provided, for example, in a driving system, a braking system and a steering system. In addition to these, internal sensors such as a vehicle speed sensor and an acceleration sensor are provided in the automatic drive system 1. These sensors are configured to acquire information on traveling state of the subject vehicle.

The ECU 10 is an electronic control unit having at least one CPU, at least one ROM, at least one RAM. Various programs for automatic drive of the subject vehicle and various data including map data are stored in the ROM. The program stored in the ROM is loaded into the RAM and executed by the CPU thereby the ECU 10 realizes various functions mentioned below. The ECU 10 may be composed of a plurality of ECUs.

In FIG. 1, among the functions for the travel assist controls possessed by the ECU 10, functions relating to object recognition and functions relating to decelerating assist control are represented by blocks. Other functions for the travel assist controls are omitted.

The ECU 10 has functions to recognize the objects existing around the subject vehicle and to distinguish among objects located within a lane along which the subject vehicle travels (hereinafter also referred to as a "own lane OL"), objects located within an lane adjacent to the own lane (hereinafter also referred to as an "adjacent lane AL"), and objects located outside of the own lane OL and the adjacent lane AL. This function is realized by a lane shape estimation portion 11, an object position estimation portion 12, a distance between subject vehicle and object calculation portion 13, a lane presence determination portion 14, a relative speed calculation portion 15, and a lane determining width set portion 16. The ECU 10 also has a function to determine type of decelerating assist control of the subject vehicle based on the discrimination result of the objects existing around the subject vehicle. This function is realized by a target acceleration calculation portion 17 of the ECU 10. These portions 11, 12, 13, 14, 15, 16, and 17 do not exist as hardware in the ECU 10, but are realized as software when the program stored in the ROM is executed by the CPU.

Here, "objects existing around the subject vehicle" refer to moving objects such as a walker, a bicycle and a vehicle, and fixed objects such as street plants, telephone poles, buildings, road structures. The moving objects are not limited to those in moving state, but includes those in stopping state or sleeping state. In other words, the moving objects includes objects which are not fixed on a road and the like at the recognition by the autonomous recognition sensors and able to move in the near future. Hereinafter, such a moving object is also referred to as a "non-fixed object NFO". In addition, the "adjacent lane AL" refers to the lane adjacent to own lane OL on the left or right side thereof. However, the "adjacent lane AL" includes a side strip adjacent to the own lane OL on the left side or the right side thereof. The side strip refers to an area located further outward than an outermost lane marker (a compartment line) when the subject vehicle travels along the outermost lane. However, lanes along which other vehicles than the subject vehicle are able to travel in an opposite direction to the travel direction of the subject vehicle are excluded from the "adjacent lane AL".

The portion 11 estimates the shape and position of the lane around the subject vehicle. The estimation processing of the shape and position of the lane is performed, for example, as follows. First, a shot image data in front of the subject vehicle obtained by the stereo camera 4 is captured, and then the luminance gradient vector of each pixel of the shot image is calculated. Subsequently, the luminance gradient vector of each pixel is evaluated, and the lane marker is detected based on the assessment result. Subsequently, a center line of the detected lane marker is specified, and then the shape and position of the detected lane are estimated using the pixels forming this center line and a preset shape model. Note that such estimation processing is known and is disclosed in, for example, JP 2008-21102 A. When shape information of the lane is included in the map information of the map database 6, the shape and the position of the lane may be estimated based on the shape information and the position of the subject vehicle.

The portion 12 estimates the position of an object existing around the subject vehicle. The estimation processing of the position of the object is performed, for example, as follows. First, distance measurement data of an object acquired by the LIDER 2 is captured and then clustering processing is performed. The clustering processing is performed based on position and height of each distance measuring point on a reference frame at which the subject vehicle is positioned. In this clustering processing, continuity is maintained with processing result of the previous frame. Subsequently, the clustered distance measurement points are surrounded by a rectangle landmark frame in the reference frame to form one landmark. Note that the position of the object may be estimated based on the distance measurement data of an object acquired by the millimeter wave radar 3. The estimation processing applicable to the present disclosure is not limited to the processing mentioned above but various known estimation processing may be used.

The portion 13 calculates a relative distance DRw in the vehicle's width direction of the subject vehicle between the position of the subject vehicle and the position of the object existing around the subject vehicle. The position of the object existing around the subject vehicle is that estimated by the portion 12. The position of the subject vehicle is estimated, for example, by the GPS signal received by the GPS receiver 5. The calculation processing of the relative distance DRw is performed, for example, as follows. First, coordinate conversion is performed on the GPS signal to the reference frame. Subsequently, in this reference frame, a shortest distance from an extension line of a longitudinal axis Afrov of the subject vehicle to positional coordinates of the object is calculated. The shortest distance corresponds to the relative distance DRw. The relative distance DRw is calculated for each object around the subject vehicle. However, the calculation processing of the relative distance DRw need not be performed for all objects around the subject vehicle. That is, the calculation processing may be performed to objects that are relatively short in a straight-line distance from the subject vehicle. The calculation processing may be performed only to a relative distance DRwn between the position of the subject vehicle and the position of the non-fixed object NFO with the shortest straight-line distance from the subject vehicle (hereinafter also referred to as a "nearest non-fixed object NFOn" or simply referred to as a "non-fixed object NFOn").

The portion 14 determines whether an object around the subject vehicle exists on the own lane OL or the adjacent lane AL. The portion 14 includes an own lane presence determining portion 14a and an adjacent lane presence determining portion 14b. The portion 14a determines whether or not the object is located on the own lane OL. When it is determined that the object is not located on the own lane OL, the portion 14b determines whether or not the object is located on the adjacent lane AL.

The determination processing in the portion 14a is performed by comparing a determination width for own lane Wolth described later and the relative distance DRw. If the relative distance DRw is shorter than the determination width for own lane Wolth, it is determined that the object having the relative distance DRw exists on the own lane OL. Conversely, if the relative distance DRw is longer than the determination width for own lane Wolth, it is determined that the object having the relative distance DRw does not exist on the own lane OL. If the relative distance DRw is longer than the determination width for own lane Wolth, determination processing is performed in the portion 14b based on the same relative distance DRw.

The determination processing in the portion 14b is performed by comparing the determination width for adjacent lane Walth and the relative distance DRw (N.B., DRw>Wolth). The determination width for adjacent lane Walth is the value obtained by adding an adjacent lane width Wal to the determination width for own lane Wolth (i.e., Walth=Wolth+Wal). The adjacent lane width Wal is calculated based on the shape of the adjacent lane AL estimated by the portion 11. If the relative distance DRw is shorter than the determination width for adjacent lane Walth, it is determined that the object having the relative distance DRw exists on the adjacent lane AL. Conversely, when the relative distance DRw is longer than the determination width for adjacent lane Walth, it is determined that the object having the relative distance DRw does not exist on the adjacent lane AL. That is, if the relative distance DRw is longer than the determination width for adjacent lane Walth, it is determined that the object having the relative distance DRw exists on a lane being different from the own lane OL and the adjacent lane AL (e.g., a lane next to own lane OL).

Note that, in the determination processing in the portion 14b, it is also possible to use a value obtained by adding an own lane width Wol to the determination width for own lane Wolth (i.e., Wolth+Wol) instead of using the determination width for adjacent lane Walth. The own lane width Wol is calculated based on the shape of the own lane OL estimated by the portion 11. The reason for this is that the adjacent lane width Wal and the own lane width Wol are equal in many cases. Also, the determination processing in the portion 14a or 14b need not be performed for all the relative distances DRw of all objects around the subject vehicle. That is, the determination processing may be performed to the relative distances DRw of several objects that are relatively short in the straight-line distance from the subject vehicle. The determination processing may be performed only to the relative distance DRwn.

The portion 15 calculates relative speed VRt of the object in the travel direction of the subject vehicle. The relative speed VRt in the travel direction is calculated, for example, as follows. First, a plurality of reflection points of electromagnetic waves from the millimeter wave radar 3 which were reflected on the surface of the object are calculated. Subsequently, the position of a representative point of the object is set based on these reflection points. The representative point is, for example, the position of a reflection point at the end of the object or the position of center of gravity of the object. Subsequently, based on the representative point, relative state quantity composed of a relative position and a relative distance between the subject vehicle and the object is calculated. The relative speed VRt is calculated from the time series change of this relative state quantity. Note that the calculation of the relative speed VRt is not necessarily performed on all objects around the subject vehicle. That is, the calculation of the relative speed VRt may be performed to objects that are relatively short in the straight-line distance from the subject vehicle. The calculation of the relative speed VRt may be performed only to the nearest non-fixed object NFOn. That is, only relative speed VRtn of the nearest non-fixed object NFOn may be calculated.

The portion 16 sets the determination width for own lane Wolth to be used for the determination processing in the portion 14. The determination width for own lane Wolth is set virtually in front of the subject vehicle to determine whether or not an object exists on the own lane OL. As an example, the determination width for own lane Wolth is set to gradually expand in a lane-width direction as it goes away from the subject vehicle. As will be described in detail later, the determination width for own lane Wolth is changed (enlarged or reduced) in the lane-width direction based on the relative speed VRtn calculated by the portion 15. If there is no non-fixed object NFO in front of the subject vehicle, the determination width for own lane Wolth is set based on the own lane width Wol. In this case, for example, the determination width for own lane Wolth at a closest position to the subject vehicle (for example, at a front bumper of the subject vehicle) is set to a width Wolth_0 substantially equal to half of the own lane width Wol (i.e., Wolth_0=Wol/2).

The portion 17 calculates a target acceleration (more accurately, a target deceleration) TA of the subject vehicle during the decelerating assist control. The portion 17 has a target acceleration in own lane calculation portion 17a and a target acceleration in adjacent lane calculation portion 17b. The portion 17a calculates the target acceleration TAol when the nearest non-fixed object NFOn exists on the own lane OL. The portion 17b calculates a target acceleration (more accurately, the target deceleration) TAal when the nearest non-fixed object NFOn exists on the adjacent lane AL.

The calculation processing of the target acceleration TAol in the portion 17a is performed, for example, as follows. First, a relative distance DRt in the travel direction of the subject vehicle between the position of the non-fixed object NFOn and the position of the subject vehicle is calculated. Subsequently, based on the relative speed VRt of the non-fixed object NFOn and the relative distance DRt, a predicted collision time TTC (i.e, time to collision), which is means a period from now until the subject vehicle would collide with the non-fixed object NFOn (i.e., a remaining time until the collision) is calculated by the following equation (1).

$$TTC=DRt/VRt \quad (1)$$

Subsequently, supposing that the subject vehicle travels while maintaining the current running state, a determination on a risk to collide with the non-fixed object NFOn (hereinafter also referred to as a "collision risk") is performed. The determination on the collision risk is performed by comparing the predicted collision time TTC and a collision value Tth1. When the predicted collision time TTC is less than the collision value Tth1, the collision risk is determined to be high. On the other hand, if not, the collision risk is determined to be low. If the collision risk is determined to be high, the target acceleration TAol is set. The target acceleration TAol is set based on, for example, the relative speed VRt of the non-fixed object NFOn, the relative distance DRt, and a gradient of the own lane OL. If the collision risk is determined to be low, the target acceleration TAol is not set. Or, the target acceleration TAol is set to the same value as the current target acceleration TAol. That is, the current target acceleration TAol is maintained.

The calculation processing of the target acceleration TAal in the portion 17b is basically the same as that of the target acceleration TAol in the portion 17a. However, in this case, a collision value Tth2 (N.B., Tth2>Tth1) is used for the determination on the collision risk since the non-fixed object NFOn exists on the adjacent lane Al. When the predicted collision time TTC is less than the collision value Tth2, the collision risk is determined to become high under a condition where the non-fixed object NFOn intrudes into the own lane in the near future. On the other hand, if not, the collision risk is determined to remain low even if the non-fixed object NFOn intrudes into own lane OL in the near future.

If the collision risk is determined to become high, the target acceleration TAal is set. The target acceleration TAal is set based on, for example, the relative distance DRt and the gradient of the own lane OL so that the relative speed VRt of the non-fixed object NFOn decreases to be equal to or less than a predetermined relative speed VRc. If the collision risk is determined to be low, the target acceleration TAal is not set. Or, the target acceleration TAal is set to the same value as the current target acceleration TAal. That is, the current target acceleration TAal is maintained.

2. Detail of Lane Determination Width Set Portion 16

2.1 Outline of Standard Deceleration Assist Control

Figure 2:
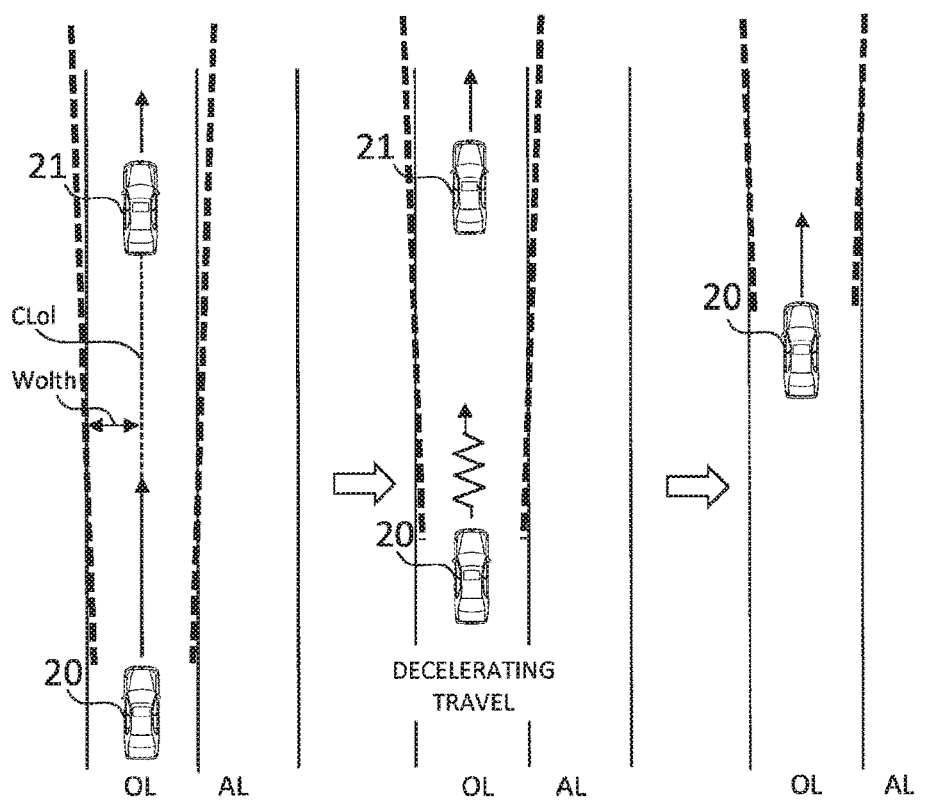
FIG. 2 is a diagram for describing an outline of standard deceleration assist control using a determination width for own lane Wolth.

FIG. 2 is a diagram for describing an outline of standard deceleration assist control using the determination width for own lane Wolth. FIG. 2 illustrates three surrounding circumstances of a subject vehicle 20 changing with the passage of time. The determination width for own lane Wolth is set in the lane-width direction to extend from a center line CLol of the own lane OL. The center line CLol is calculated based on the shape of the own lane OL estimated by the portion 11. A range surrounded by two broken lines shown in FIG. 2 corresponds to a range recognized as the own lane OL with the determination width for own lane Wolth. In front of each vehicle shown in FIG. 2, an arrow is drawn whose length increase as traveling speed of the vehicle is faster. That is, in the example shown in FIG. 2, the subject vehicle 20 is traveling at a higher speed than a preceding vehicle 21. The relationship between the length of the arrow and the traveling speed is similarly established in figures other than FIG. 2.

In the situation shown in the leftward of FIG. 2, the subject vehicle 20 recognizes that the preceding vehicle 21 (i.e., the nearest non-fixed object NFOn in this figure) exists on the own lane OL. However, in the situation shown in the leftward, it is further determined that a risk to collide with the preceding vehicle 21 is low. Hence the decelerating assist control has not been executed. Thereafter, when the relative distance DRt becomes shorter, the situation changes to the one shown in the middle of FIG. 2. The situation shown in the middle corresponds to a situation where it is determined that the risk to collide with the preceding vehicle 21 becomes high. In such a situation, the decelerating assist control is executed and the subject vehicle 20 is deaccelerated. The execution of the decelerating assist control is continued until it is determined that the risk to collide with the preceding vehicle 21 becomes low. Thereafter, when the relative speed VRt decreases, the situation changes to the one shown in the rightward of FIG. 2. The situation shown in the rightward corresponds to a situation where it is determined that the risk to collide with the preceding vehicle 21 becomes low. In such a situation, the execution of the decelerating assist control has been terminated and the subject vehicle 20 travels at a constant speed by another travel assist control (e.g., constant speed assist control) which is executed instead of the decelerating assist control.

2.2 Problems of Standard Deceleration Assist Control

Figure 3:
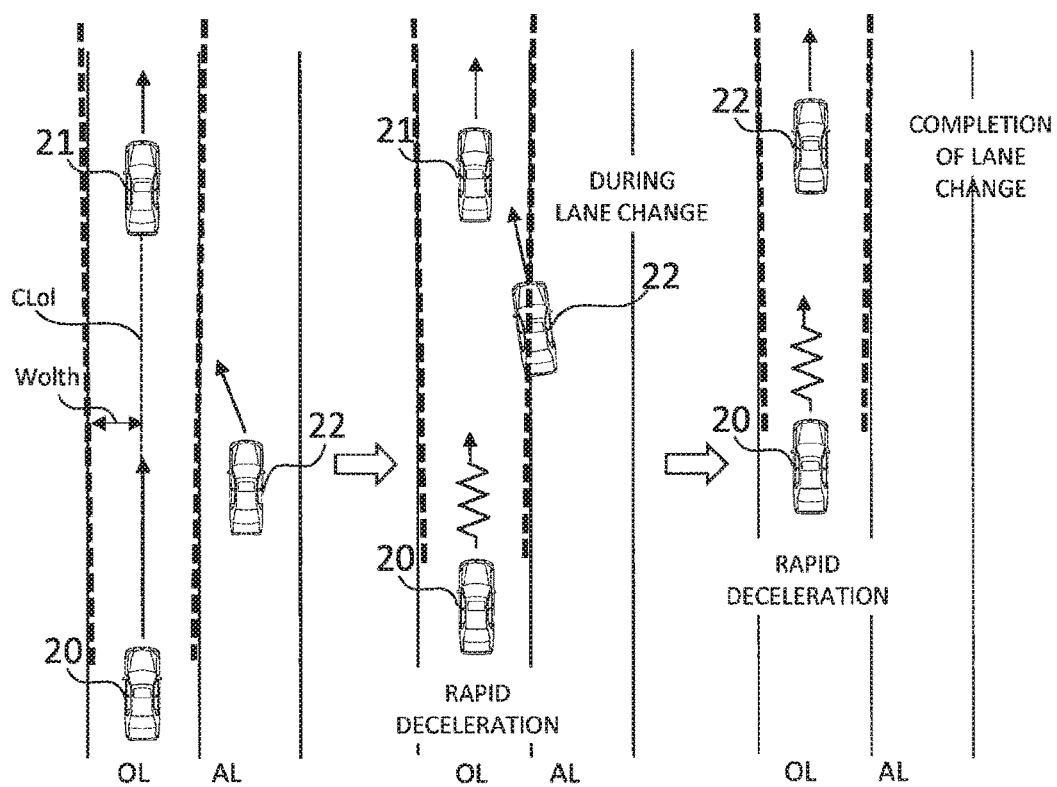
FIG. 3 is a diagram for describing a problem of the standard deceleration assist control.
Figure 4:
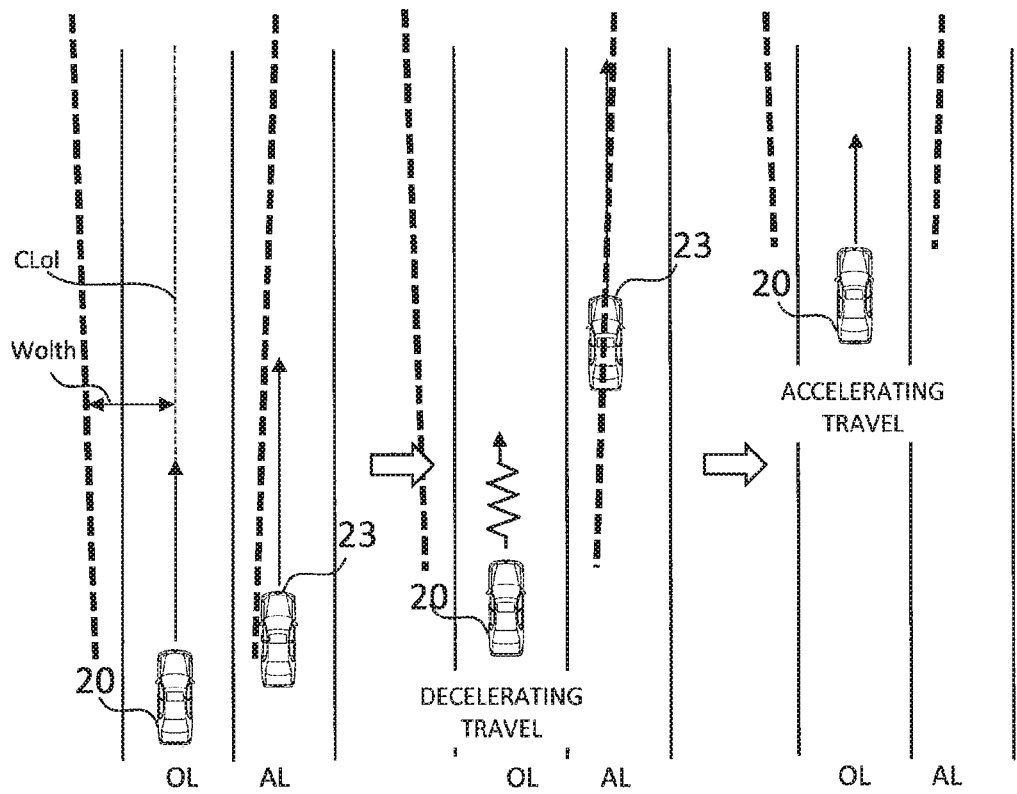
FIG. 4 is a diagram for describing another problem of the standard deceleration assist control.

FIGS. 3 to 4 are diagrams for describing problems of the standard deceleration assist control. Likewise FIG. 2, FIG. 3 illustrates three surrounding circumstances of the subject vehicle 20 changing with the passage of time. The difference between FIG. 2 and FIG. 3 is that a preceding vehicle 22 (i.e., the nearest non-fixed object NFOn in this figure) shown in FIG. 3 exists on the adjacent lane AL.

In the situation shown in the leftward of FIG. 3, the subject vehicle 20 does not recognize that the preceding vehicle 22 exists on the own lane OL. Further, in the situation shown in the leftward, only the risk to collide with the preceding vehicle 21 is considered and this risk is determined to be low. Therefore, the decelerating assist control has not been executed. However, when an intrusion of the preceding vehicle 22 into a range being recognized as the own lane OL is occurred in accompany with a lane change operation, the situation changes to the one shown in the middle of FIG. 3. The situation shown in the middle corresponds to a situation where it is determined that the preceding vehicle 22 exists on the own lane OL and also the risk to collide with the preceding vehicle 22 is high. In such a situation, the decelerating assist control is surely executed, but a rapid deceleration of the subject vehicle 20 is inevitable. Thereafter, the situation change to the one shown in the rightward of FIG. 3 in accompany with the completion of the lane change of the preceding vehicle 22. In such a situation shown in the rightward, the decelerating assist control is continuously executed since the relative distance DRt is still short.

As described above, when the preceding vehicle 22 is not taken into consideration, the occupant of the subject vehicle 20 receives an uncomfortable feeling at the lane change of the preceding vehicle 22. In this regard, if the determination width for own lane Wolth is expanded to the lane-width direction, it is possible to recognize the preceding vehicle on the adjacent lane AL. However, when the determining width for own lane Wolth is expanded, another problem arises. FIG. 4 is a diagram for describing a problem assumed when the determination width for own lane Wolth is expanded. Likewise FIG. 2, FIG. 4 illustrates three surrounding circumstances of the subject vehicle 20 changing with the passage of time. The differences between FIG. 2 and FIG. 4 are that the preceding vehicle 21 does not exist on FIG. 4, the determination width for own lane Wolth shown in FIG. 4 is relatively wide and a preceding vehicle 23 (i.e., the nearest non-fixed object NFOn in this figure) shown in FIG. 4 travels faster than the subject vehicle 20.

In the situation shown in the leftward of FIG. 4, the subject vehicle 20 does not recognize that the preceding vehicle 23 exists on the own lane OL. Therefore, the decelerating assist control has not been executed. However, when an intrusion of the preceding vehicle 23 into the range being recognized as the own lane OL is occurred thereafter, the situation changes to the one shown in the rightward of FIG. 4. The situation shown in the rightward corresponds to a situation where it is determined that the risk to collide with the preceding vehicle 23 is low. In such a situation, the execution of the decelerating assist control has been terminated and the subject vehicle 20 is accelerated by another travel assist control (e.g., acceleration assist control) which is executed instead of the decelerating assist control.

As already described, the preceding vehicle 23 travels faster than the subject vehicle 20. Therefore, even if the preceding vehicle 23 shown in the middle of FIG. 4 intrudes into the own lane OL in accompany with the lane change operation, there is little risk to collide with the preceding vehicle 23. Then, if the determination width for own lane Wolth is simply expanded in the lane-width direction, unnecessary decelerating travel of the subject vehicle 20 is performed, which gives the occupant of the subject vehicle 20 an uncomfortable feeling.

2.3 Future of Lane Determining Width Set Portion 16

Figure 5:
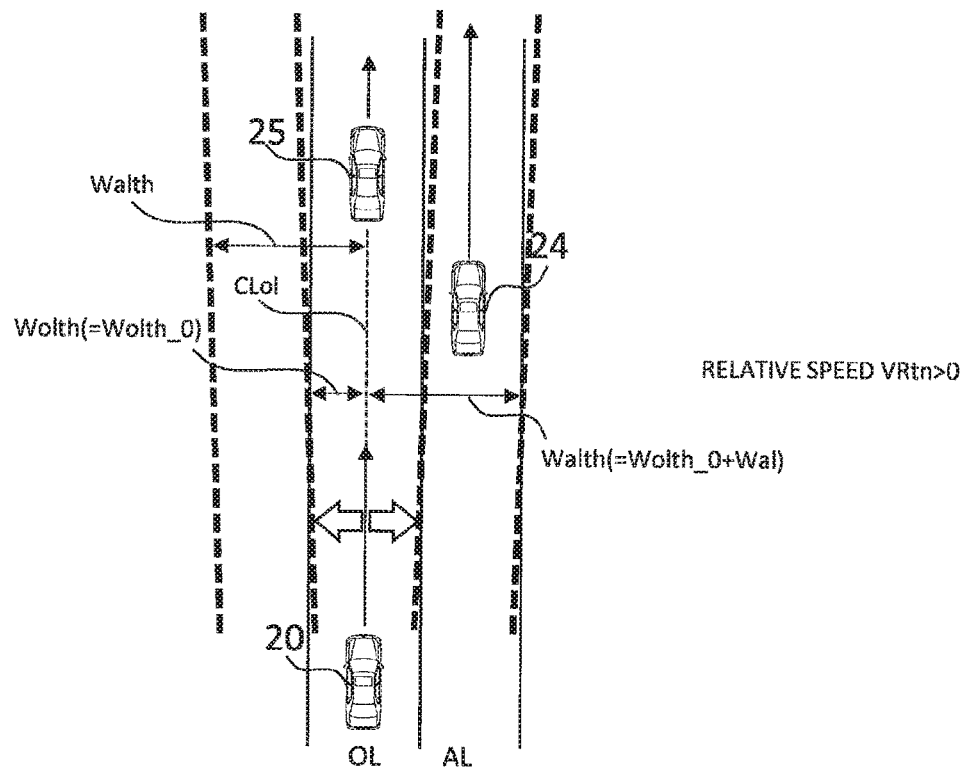
FIG. 5 is a diagram for describing an outline of modification processing of the determination width for own lane Wolth by a determination width set portion.
Figure 6:
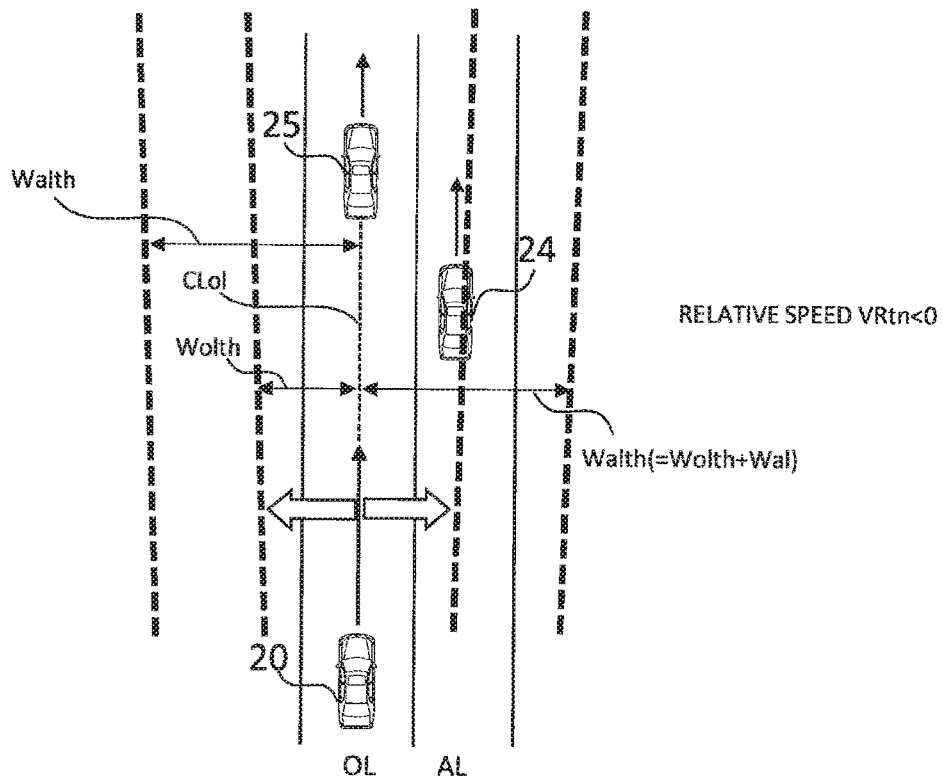
FIG. 6 is a diagram for describing an outline of modification processing of the determination width for own lane Wolth by the determination width set portion.
Figure 7:
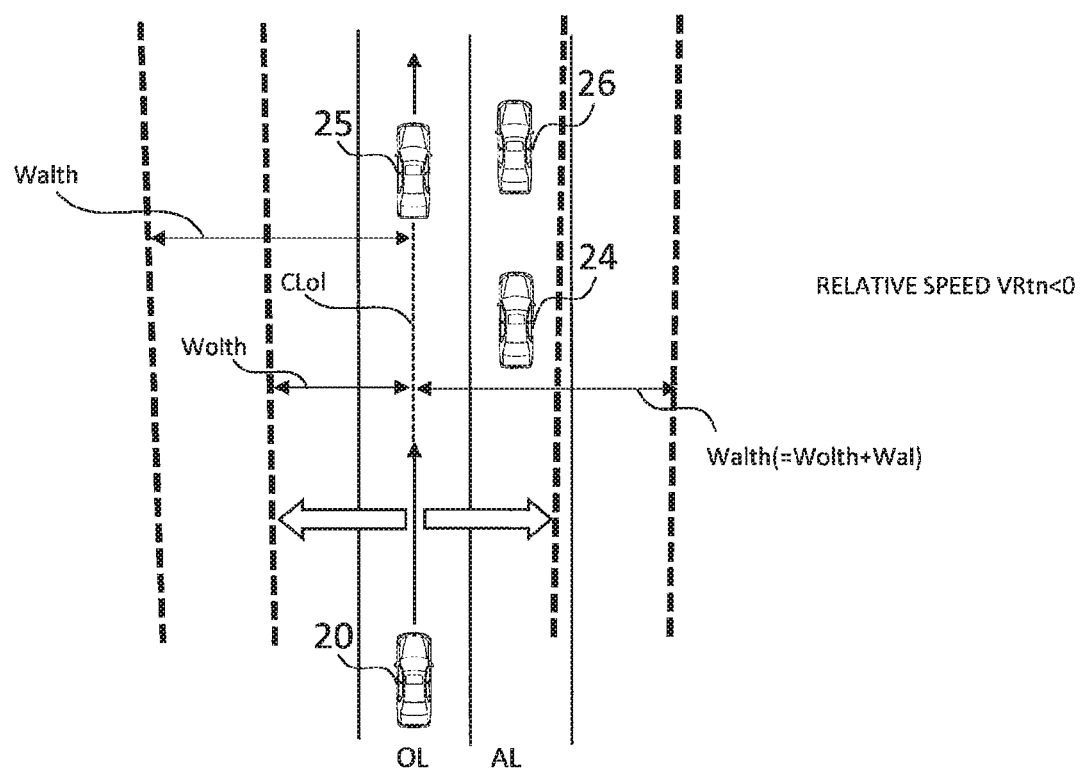
FIG. 7 is a diagram for describing an outline of modification processing of the determination width for own lane Wolth by the determination width set portion.

In consideration of the problems described in FIGS. 3 to 4, the portion 16 changes the determination width for own lane Wolth in the lane-width direction based on the relative speed VRtn of the nearest non-fixed object NFOn which is calculated by the portion 15. FIGS. 5 to 7 are diagrams for describing an outline of modification processing of the determination width for own lane Wolth by the portion 16.

FIG. 5 shows an example of the determination width for own lane Wolth which is set when the sign of the relative speed VRtn is positive (i.e., VRtn>0). In the example shown in FIG. 5, the non-fixed object NFOn does not correspond to the preceding vehicle 21 travelling along the own lane OL but a preceding vehicle 24 traveling along the adjacent lane AL. Therefore, the relative speed VRtn of the non-fixed object NFOn corresponds to the relative speed VRt of the preceding vehicle 24. The sign of the relative speed VRtn is positive. The reason for this is that the preceding vehicle 24 is traveling faster than the subject vehicle 20.

In the example shown in FIG. 5, since the sign of the relative speed VRtn is positive, the determination width for own lane Wolth is set to the same width Wolth_0 as when there is no object ahead of the subject vehicle. When the width Wolth_0 is set, a preceding vehicle 25 (i.e., the straight-line distance from the subject vehicle is the second shortest non-fixed object NFO in this figure) is recognized to exist on the own lane OL. Therefore, if it is determined that a risk to collide with the preceding vehicle 25 is high, the decelerating assist control for preventing collision with the preceding vehicle 25 is executed. In addition, in the example shown in FIG. 5, the determination width for adjacent lane Walth is set to a value obtained by adding an adjacent lane width Wal to the width Wolth_0 (i.e, Walth=Wolth_0+Wal). Therefore, if it is determined that a risk to collide with the preceding vehicle 24 increases, the decelerating assist control for preventing collision with the preceding vehicle 24 is executed.

FIG. 6 shows an example of the determination width for own lane Wolth which is set when the sign of the relative speed VRtn is negative (i.e., VRtn<0). Likewise the example shown in FIG. 5, in the example shown in FIG. 6, the preceding vehicle 24 traveling along the adjacent lane AL corresponds to the non-fixed object NFOn and the relative speed VRtn of the non-fixed object NFOn corresponds to the relative speed VRt of the preceding vehicle 24. The sign of the relative speed VRtn is negative. The reason for this is that the preceding vehicle 24 is traveling slower than the subject vehicle 20.

In the example shown in FIG. 6, since the sign of the relative speed VRtn is negative, the determination width for own lane Wolth is expanded in the lane-width direction. When the determination width for own lane Wolth is expanded, the preceding vehicles 24 and 25 are recognized to exist on the own lane OL. Therefore, if it is determined that the risk to collide with the preceding vehicle 24 is high, the decelerating assist control for preventing collision with the preceding vehicle 24 is executed. In addition, if it is determined that the risk to collide with the preceding vehicle 25 is high, the decelerating assist control for preventing collision with the preceding vehicle 25 is executed.

FIG. 7 shows an example of the determining width for own lane Wolth which is set when the subject vehicle catches up with a tail of traffic congestion. In the example shown in FIG. 7, the tail of traffic congestion of the adjacent lane AL is located closer to the subject vehicle side than the tail of traffic congestion of the own lane OL. In addition, the preceding vehicle 24 and a preceding vehicle 26 on the adjacent lane AL are stopped or traveling at an extremely low speed while the preceding vehicle 25 on the own lane is traveling at a low speed.

The modification processing of the determination width for own lane Wolth in the example shown in FIG. 7 is basically the same as the one in the example shown in FIG. 6. That is, the sign of the relative speed VRtn of the preceding vehicle 24 is negative and the determination width for own lane Wolth is expanded in the lane-width direction. However, in the example shown in FIG. 7, the absolute value of the relative speed VRtn is larger than the one in the example shown in FIG. 6. Hence the determination width for own lane Wolth shown in FIG. 7 is more expanded in the lane-width direction as compared with the one in the example shown in FIG. 6.

Figure 8:
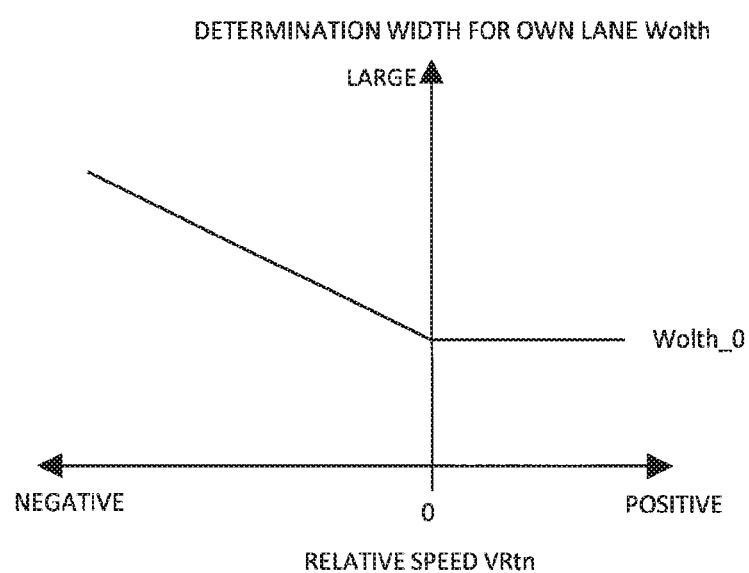
FIG. 8 is a diagram for showing an example of a relationship between relative speed VRtn and the determination width for own lane Wolth.

FIG. 8 is a diagram for showing an example of the relationship between the relative speed VRtn of non-fixed object NFOn and the determination width for own lane Wolth which is used for modification processing of the determination width for own lane Wolth. As shown in FIG. 8, when the sign of the relative speed VRtn is positive or when the relative speed VRtn equals to zero, the determining width for own lane Wolth is set to a constant value (i.e., Wolth_0). When the sign of VRtn is negative, the determination width for own lane Wolth is set to a larger value as the absolute value of relative speed VRtn increases. The reason for this is that the collision risk increases as the absolute value of the negative relative speed VRtn increases.

3. Effect of the First Embodiment

According to the vehicle control device according to the first embodiment described above, it is determined which lane the nearest non-fixed object NFDn is located by using the determination width for own lane Wolth which is variably set based on the relative speed VRt. Therefore, if it is determined that the non-fixed object NFDn exists on the own lane OL, it is possible to execute the standard decelerating assist control. Even if it is determined that the non-fixed object NFDn exists on the adjacent lane AL, it is possible to execute the decelerating assist control while considering the intrusion of the non-fixed object NFDn into the own lane OL in the near future.

In particular, the situation described in FIG. 7 is assumed when the subject vehicle catches up with tail of traffic congestion during a travel on a highway. If the determination width for own lane Wolth is not modified, the subject vehicle 20 shown in FIG. 7 may overtake the preceding vehicles 24 and 26 on the adjacent lane AL at high speed. Here, the preceding vehicles 24 and 26 are stopped or traveling at an extremely low speed. Thus, when the subject vehicle 20 overtakes the preceding vehicles 24 and 26 at a high speed, it may give an uneasiness feeling to the occupant of the subject vehicle who are assuming an emergency lane change of these vehicles into the own lane. In this regard, according to the vehicle control device according to the first embodiment, the preceding vehicle 24 is handled as the non-fixed object NFDn, thereby the decelerating assist control assuming the lane change of the preceding vehicle 24 in the near future is executed appropriately. Therefore, it is possible for the subject vehicle 20 in a moderately decelerated state to catch up with the tail of traffic congestion on the own lane OL without giving the uneasiness feeling to the occupant of the subject vehicle 20.

In the first embodiment described above, the LIDER 2 or the millimeter wave radar 3 shown in FIG. 1 corresponds to the "non-fixed object detection device" of the first aspect. The ECU 10 shown in FIG. 1 corresponds to the "control unit" of the first aspect.

Second Embodiment

Next, a second embodiment of the present disclosure will be described with reference to FIGS. 9 to 12.

Note that the configuration common to the first embodiment and descriptions thereon will be omitted as appropriate.

1. Configuration of Automatic Drive System

Figure 9:
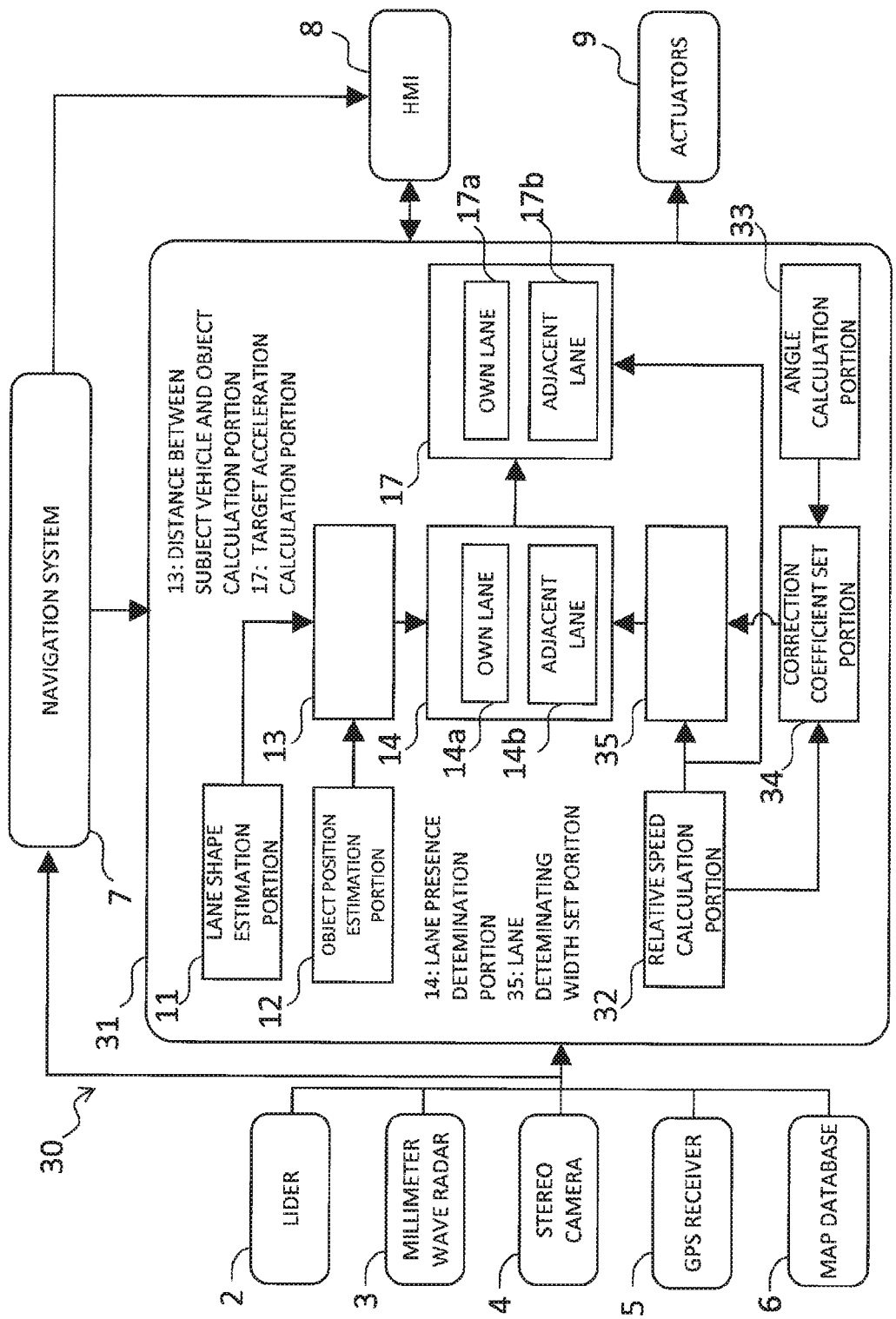
FIG. 9 is a diagram for showing a configuration of an automatic drive system to which a vehicle control device according to a second embodiment of the present disclosure is applied.

FIG. 9 is a diagram for showing a configuration of an automatic drive system to which the vehicle control device according to the second embodiment is applied. The automatic drive system 30 shown in FIG. 9 includes an ECU 31. Likewise the ECU 10 shown in FIG. 1, the ECU 31 is an electronic control unit having at least one CPU, at least one ROM and at least one RAM.

In FIG. 9, among the functions for the travel assist controls possessed by the ECU 31, functions relating to object recognition and functions relating to decelerating assist control are represented by blocks. Other functions for the travel assist controls possessed by the ECU 31 are omitted. The ECU 31 has functions for realizing the function related to object recognition, a relative speed calculation portion 32, an angle calculation portion 33, a correction coefficient set portion 34 and a lane determining width set portion 35 in addition to the portions 11, 12, 13, 14, 17 common to FIG. 1. These portions 32, 33, 34 and 35 do not exist as hardware in the ECU 31, but are realized as software when the program stored in the ROM is executed by the CPU.

Likewise the portion 15 shown in FIG. 1, the portion 32 calculates the relative speed VRt. In addition to the relative speed VRt, the portion 32 also calculates relative speed VRw in the vehicle's width direction of the subject vehicle. The relative speed VRt and the relative speed VRw are calculated from the time series change of the relative state quantity described above. Note that the calculation of the relative speed VRt and the relative speed VRw are not necessarily performed on all objects around the subject vehicle. That is, the calculation of the relative speed VRt and the relative speed VRw may be performed to objects that are relatively short in the straight-line distance from the subject vehicle. The calculation of the relative speed VRt and the relative speed VRw may be performed only to the nearest non-fixed object NFOn. That is, only relative speed VRwn of the nearest non-fixed object NFOn and the relative speed VRtn may be calculated.

Figure 10:
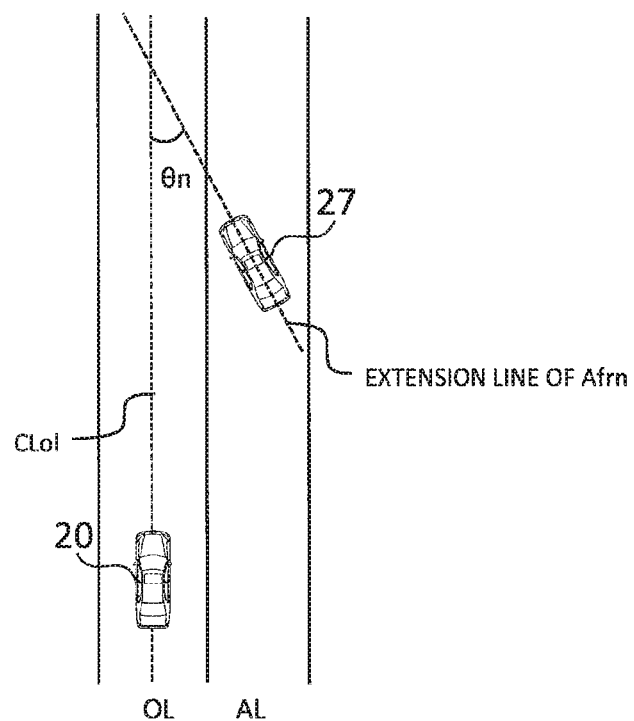
FIG. 10 is a diagram for describing an angle θn which is formed by a center line CLol and an extension line of a longitudinal axis Afrn.

The portion 33 calculates an angle θn between an extension line of a front-back axis Afrn of the nearest non-fixed object NFOn and the center line CLol. FIG. 10 is a view for describing the angle θn. In FIG. 10, a preceding vehicle 27 existing on the adjacent lane AL is illustrated as the nearest non-fixed object NFOn. The angle θn is calculated as an angle between the extension line of the longitudinal axis Afrn of the preceding vehicle 27 and the center line CLol. Taking a relative direction of the non-fixed object NFOn into consideration, the sign of the angle θn is set while setting the center line CLol as a starting line (i.e., the angle θn at the center line CLol is 0°). Specifically, in FIG. 10, since the relative direction of the preceding vehicle 27 is on the rightward of the subject vehicle 20, it is assumed that a counterclockwise rotation of the extension line is considered as positive angle while a clockwise rotation of the extension line is considered as negative angle. Supposed that the relative direction of the preceding vehicle 27 is on the leftward of the subject vehicle 20, it is assumed that the counterclockwise rotation of the extension line is considered as negative angle while the clockwise rotation of the extension line is considered as positive angle.

Figure 11:
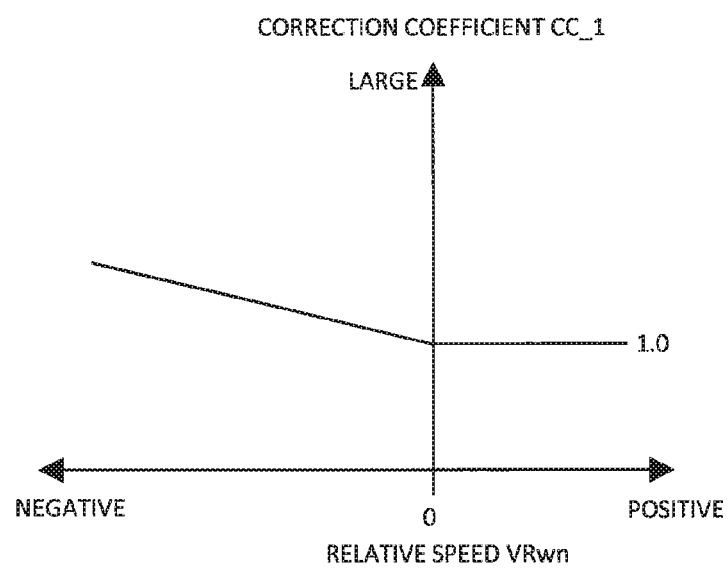
FIG. 11 is a diagram for showing an example of a relationship between relative speed VRwn and a correction coefficient CC_1.

The portion 34 sets at least one of correction coefficients CC_1 and CC_2 for correcting the determination width for own lane Wolth. FIG. 11 is a diagram for showing an example of a relationship between the relative speed VRwn and the correction coefficient CC_1. As shown in FIG. 11, when the sign of the relative speed VRwn is positive or zero, the correction coefficient CC_1 indicates a constant value (i.e., CC_1=1.0). When the sign of the relative speed VRwn is negative, the correction coefficient CC_1 represents a large value as the absolute value of the relative speed VRwn increases. The reason for this is that if the non-fixed object NFOn exists on the adjacent lane AL, the collision risk becomes higher as the absolute value of the negative relative speed VRwn increases.

Figure 12:
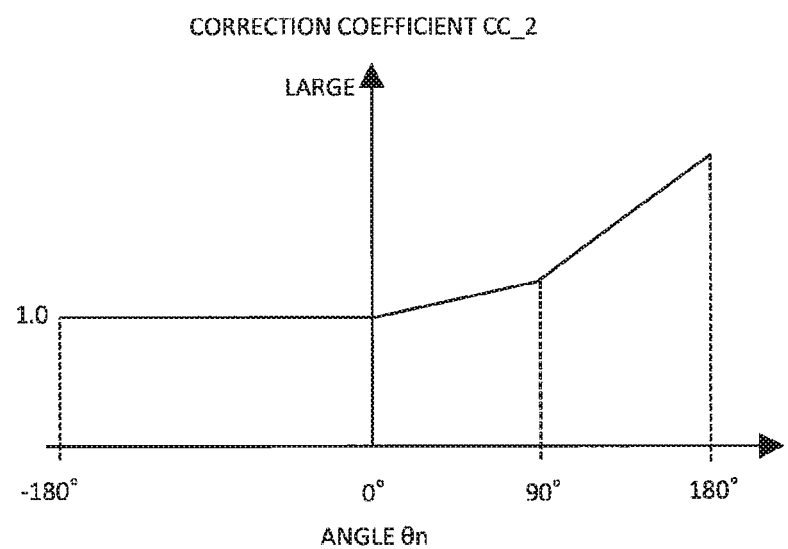
FIG. 12 is a diagram for showing an example of a relationship between the angle θn and a correction coefficient CC_2.

FIG. 12 is a diagram for showing an example of a relationship between the angle θn and the correction coefficient CC_2. As shown in FIG. 12, when the angle θn is in a range from −180° to 0°, the correction coefficient CC_2 indicates a constant value ((i.e., CC_12=1.0). When the angle θn is in a range from 0° to 90°, the correction coefficient CC_2 represents a large value as the angle θn increases. The reason for this is that if the non-fixed object NFOn exists on the adjacent lane AL, the collision risk becomes higher as the angle θn increases. Also, when the angle θn is in a range from 90° to 180°, the correction coefficient CC_2 represents a larger value as the angle θn increases. The reason for this is that if the angle θn is larger than 90°, the non-fixed object NFOn is heading toward the subject vehicle, and the collision risk increases suddenly.

The portion 35 changes the determination width for own lane Wolth based on the relative speed VRtn similarly to the portion 16 shown in FIG. 1. The portion 35 further corrects the changed determination width for own lane Wolth by using at least one of the relative speed VRwn and the angle θn.

2. Effect of the Second Embodiment

According to the vehicle control device according to the second embodiment described above, the determination width for own lane Wolth is corrected by at least one of the relative speed VRwn and the angle θn. Therefore, it is possible to improve the accuracy of the determination as to which lane the non-fixed object NFDn is located.

In the second embodiment described above, the correction coefficient CC_1 corresponds to the "first correction coefficient" of the third aspect and the correction coefficient CC_2 corresponds to the "second correction coefficient" of the fourth aspect.

Other Embodiments

The vehicle control device according to each of the embodiments described above may be modified as follows.

Figure 13:
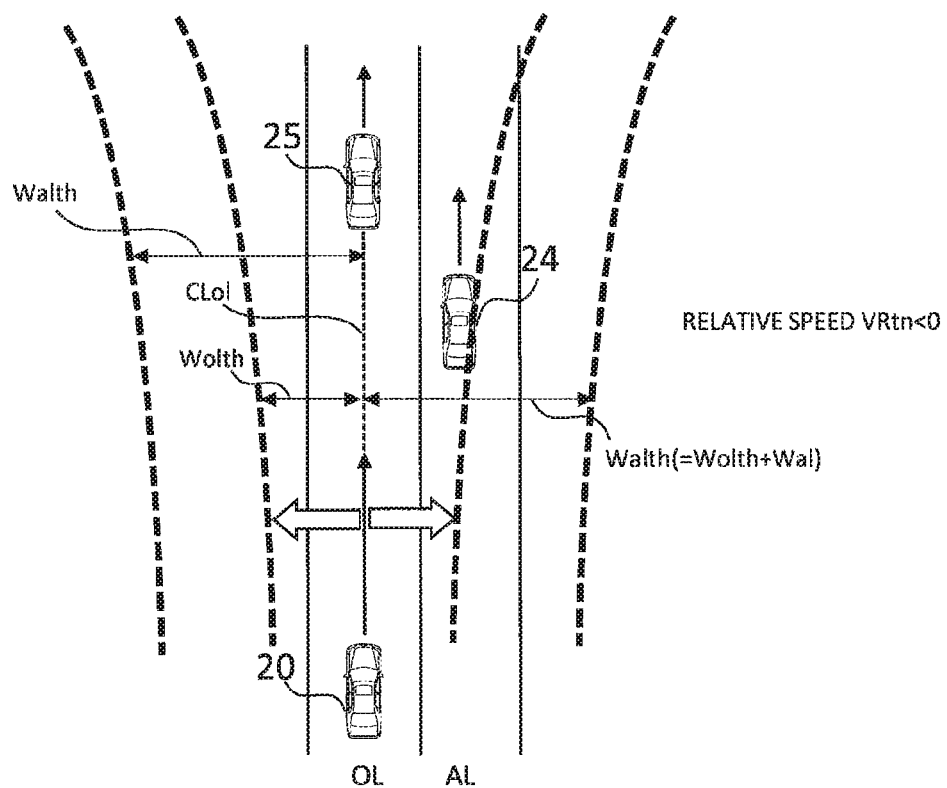
FIG. 13 a diagram for describing an outline of modification processing by the determination width set portion in which another determination width for own lane Wolth is used.

In the first embodiment mentioned above, the determination width for own lane Wolth was set to linearly expand in the lane-width direction as it goes away from the subject vehicle. However, the determination width for own lane Wolth may be set to increase exponentially in the lane-width direction as it goes away from the subject vehicle. FIG. 13 is a diagram for describing an outline of modification processing by the determination width set portion 16 in which another determination width for own lane Wolth is used. Likewise the example shown in FIG. 6, in the example shown in FIG. 13, the preceding vehicle 24 traveling along the adjacent lane AL corresponds to the non-fixed object NFOn and the relative speed VRtn of the non-fixed object NFOn corresponds to the relative speed VRt of the preceding vehicle 24.

As shown in FIG. 13, the sign of the relative speed VRtn is negative. Therefore, in the example shown in FIG. 13, the determination width for own lane Wolth is expanded in the lane-width direction. According to this determination width for own lane Wolth, it is recognized that the preceding vehicles 24 and 25 exist on the own lane OL. Therefore, if it is determined that the risk to collide with the preceding vehicle 24 is high, the decelerating assist control for preventing collision with the preceding vehicle 24 is executed. In addition, if it is determined that the risk to collide with the preceding vehicle 25 is high, the decelerating assist control for preventing collision with the preceding vehicle 25 is executed.

Figure 14:
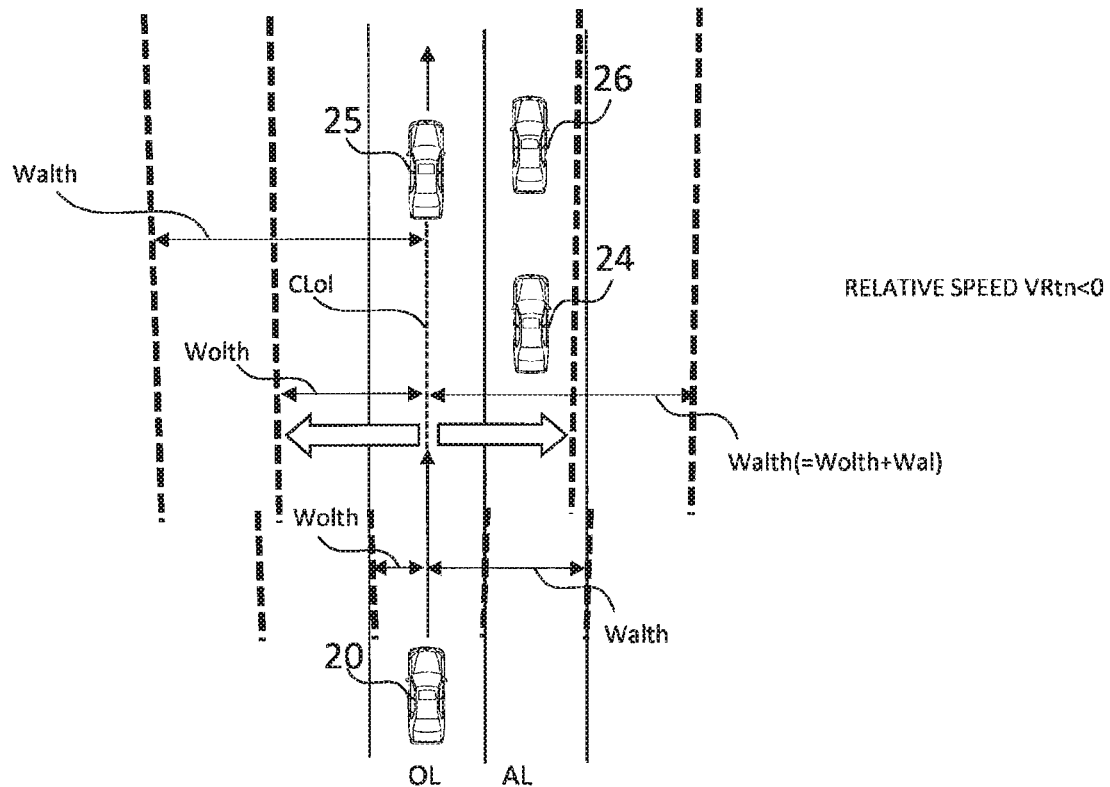
FIG. 14 is a diagram for describing an outline of modification processing by the determination width set portion in which another determination width for own lane Wolth is used.

In the first embodiment described above, in the modification processing by the portion 16, when the determination width for own lane Wolth expands in the lane-width direction, pace the expansion was fixed. However, the pace of this expansion need not be constant. For example, the pace of the expansion may be enlarged step by step starting from the position closer to the subject vehicle. FIG. 14 is a diagram for describing an outline of the modification processing by the portion 16 in which another determination width for own lane Wolth. Likewise the example shown in FIG. 6, in the example shown in FIG. 14, the preceding vehicle 24 traveling along the adjacent lane AL corresponds to the non-fixed object NFOn and the relative speed VRtn of the non-fixed object NFOn corresponds to the relative speed VRt of the preceding vehicle 24.

As shown in FIG. 14, the sign of the relative speed VRtn is negative. Therefore, in the example shown in FIG. 14, the determination width for own lane Wolth is expanded in the lane-width direction. However, the pace of the expansion is set to a low value in a place closing to the subject vehicle 20 whereas it is set to relatively a high value in a place far from the subject vehicle 20. Even such a case, it is recognized that the preceding vehicles 24 and 25 exist on the own lane OL. Therefore, if it is determined that the risk to collide with the preceding vehicle 24 is high, the decelerating assist control for preventing collision with the preceding vehicle 24 is executed. In addition, if it is determined that the risk to collide with the preceding vehicle 25 is high, the decelerating assist control for preventing collision with the preceding vehicle 25 is executed.

What is claimed is:

1. A vehicle control device comprising:
   a non-fixed object detection device configured to detect non-fixed objects in front of a subject vehicle; and
   a control unit configured to execute decelerating assist control of the subject vehicle based on a detection result of at least one non-fixed object,
   wherein the control unit is further configured to:
   calculate a relative distance, in a width direction of the subject vehicle, between the subject vehicle and a nearest non-fixed object to the subject vehicle of all non-fixed objects in front of the vehicle detected by the non-fixed object detection device; and
   determine whether to execute the decelerating assist control by comparing the relative distance and a determination width for determining an own lane along which the subject vehicle travels, wherein the determination width for determining the own lane is set based on a relative speed of the nearest non-fixed object in a travel direction of the subject vehicle.

2. The vehicle control device according to claim 1, wherein the control unit is further configured to variably set the determination width for determining the own lane, and
   wherein the control unit is further configured to, when the relative speed of the nearest non-fixed object in the travel direction of the subject vehicle is negative, set the determination width for determining the own lane to broaden as the absolute value of the relative speed of the nearest non-fixed object in the travel direction of the subject vehicle increases.

3. The vehicle control device according to claim 1, wherein the control unit is further configured to set a first correction coefficient for correcting the determination width for determining the own lane, and wherein the control unit is further configured to, when the relative speed of the nearest non-fixed object in the vehicle's width direction of the subject vehicle is negative, set the first correction coefficient to be larger as the absolute value of the relative speed in the vehicle's width direction increases.

4. The vehicle control device according to claim 1, wherein the control unit is further configured to set a second correction coefficient for correcting the determination width for determining the own lane, and wherein the control unit is further configured to, when an angle between an anterior-posterior axis of the nearest non-fixed object and a center line of the own lane is within a predetermined range, set the second correction coefficient to be larger as the angle increases.

5. The vehicle control device according to claim 1, wherein the control unit is further configured to:

determine whether or not the nearest non-fixed object exists on the own lane based on a comparison between the determination width for determining the own lane and the relative distance; and execute a first decelerating assist control of the subject vehicle when it is determined that the nearest non-fixed object exists on the own lane, wherein the first decelerating assist control is executed based on the relative speed of the nearest non-fixed object, which is determined to exist on the own lane, in the travel direction of the subject vehicle.

6. The vehicle control device according to claim 1, wherein the control unit is further configured to:

determine whether the nearest non-fixed object exists on lane adjacent to the own lane based on a comparison between a determination width for the adjacent lane and the relative distance, wherein the determination width for the adjacent lane is set by adding a width of the adjacent lane to the determination width for determining the own lane; and execute a second decelerating assist control of the subject vehicle when it is determined that the nearest non-fixed object exists on the adjacent lane, wherein the second decelerating assist control is executed based on the relative speed of the nearest non-fixed object, which is determined to exist on the adjacent lane, in the travel direction of the subject vehicle.

* * * * *